United States Patent
Lee et al.

(10) Patent No.: US 7,874,472 B2
(45) Date of Patent: Jan. 25, 2011

(54) METHOD FOR DIFFUSION BONDING METALLIC COMPONENTS WITH NANOPARTICLE FOIL

(75) Inventors: Glenn Hong Guan Lee, Singapore (SG); Wee Kwong Na, Singapore (SG)

(73) Assignee: United Technologies Corporation, Hartford, CT (US)

( * ) Notice: Subject to any disclaimer, the term of this patent is extended or adjusted under 35 U.S.C. 154(b) by 378 days.

(21) Appl. No.: 12/082,328

(22) Filed: Apr. 10, 2008

(65) Prior Publication Data
US 2009/0224027 A1 Sep. 10, 2009

(51) Int. Cl.
B23K 31/02 (2006.01)
B23P 6/00 (2006.01)

(52) U.S. Cl. .................. 228/119; 228/246; 228/248.1; 29/889.1; 29/889.2

(58) Field of Classification Search ............... None
See application file for complete search history.

(56) References Cited

U.S. PATENT DOCUMENTS

| | | | |
|---|---|---|---|
| 3,088,192 A * | 5/1963 | Turner | 29/889.721 |
| 4,026,677 A | 5/1977 | Galasso et al. | |
| 4,034,454 A | 7/1977 | Galasso et al. | |
| 4,034,906 A | 7/1977 | Carlson et al. | |
| 5,284,290 A | 2/1994 | Moore et al. | |
| 5,788,823 A | 8/1998 | Warnes et al. | |
| 5,989,733 A | 11/1999 | Warnes et al. | |
| 6,129,991 A | 10/2000 | Warnes et al. | |
| 6,187,450 B1 * | 2/2001 | Budinger et al. | 428/546 |
| 6,217,277 B1 | 4/2001 | Liu et al. | |
| 6,257,831 B1 | 7/2001 | Papple et al. | |
| 6,530,971 B1 | 3/2003 | Cohen et al. | |
| 6,531,005 B1 | 3/2003 | Bezerra et al. | |
| 6,685,431 B2 | 2/2004 | Hiskes | |
| 6,921,014 B2 | 7/2005 | Hasz et al. | |
| 6,993,826 B2 * | 2/2006 | Takahashi et al. | 29/603.12 |
| 7,051,435 B1 | 5/2006 | Subramanian et al. | |
| 7,073,247 B2 | 7/2006 | Rowe et al. | |
| 7,100,358 B2 | 9/2006 | Gekht et al. | |
| 7,134,286 B2 | 11/2006 | Markarian et al. | |
| 7,140,189 B2 | 11/2006 | Markarian et al. | |
| 7,653,996 B2 * | 2/2010 | Jungbluth et al. | 29/889.1 |
| 7,686,205 B2 * | 3/2010 | Okamoto et al. | 228/122.1 |

(Continued)

FOREIGN PATENT DOCUMENTS

WO 2005045198 A2 5/2005

OTHER PUBLICATIONS

Website Printout entitled "Isostatic Pressing," from http://www.mpif.org/isostatic.asp. Copyright 2000 (2 pages).

(Continued)

*Primary Examiner*—Kiley Stoner
(74) *Attorney, Agent, or Firm*—Kinney & Lange, P.A.

(57) ABSTRACT

A method for joining metal parts of a turbine engine component, the method comprising positioning a nanoparticle foil between faying surfaces of the metal parts, and diffusion bonding the metal with the nanoparticle foil, where the nanoparticle foil has a film thickness of about 100 micrometers or less, and comprises an alloy having an average particle size of about 500 nanometers or less.

16 Claims, 1 Drawing Sheet

U.S. PATENT DOCUMENTS

| | | | |
|---|---|---|---|
| 7,744,351 B2* | 6/2010 | Jabado et al. | 416/241 R |
| 7,758,708 B2* | 7/2010 | Mitlin et al. | 148/403 |
| 7,763,367 B2* | 7/2010 | Arndt et al. | 428/702 |
| 2001/0035069 A1* | 11/2001 | Arvidsson et al. | 75/252 |
| 2003/0200835 A1 | 10/2003 | Malie et al. | |
| 2004/0028938 A1* | 2/2004 | Saint Ramond et al. | 428/632 |
| 2004/0050913 A1 | 3/2004 | Philip | |
| 2004/0124231 A1* | 7/2004 | Hasz et al. | 228/245 |
| 2004/0169063 A1 | 9/2004 | Stueber et al. | |
| 2004/0209110 A1* | 10/2004 | Pfaendtner et al. | 428/627 |
| 2004/0245648 A1* | 12/2004 | Nagasawa et al. | 257/772 |
| 2005/0079370 A1* | 4/2005 | Corderman et al. | 428/469 |
| 2005/0112398 A1* | 5/2005 | Darolia et al. | 428/632 |
| 2005/0158590 A1* | 7/2005 | Li | 428/698 |
| 2006/0042082 A1 | 3/2006 | Minor et al. | |
| 2006/0049236 A1* | 3/2006 | Minor et al. | 228/119 |
| 2006/0242816 A1 | 11/2006 | Magdy | |
| 2007/0050976 A1* | 3/2007 | Jungbluth et al. | 29/889.1 |
| 2007/0087208 A1 | 4/2007 | Ng et al. | |
| 2007/0228108 A1* | 10/2007 | Goldschmidt et al. | 228/119 |
| 2007/0267947 A1* | 11/2007 | Matsushita et al. | 310/358 |
| 2008/0038578 A1* | 2/2008 | Li | 428/627 |
| 2008/0113217 A1* | 5/2008 | Maloney et al. | 428/701 |
| 2008/0290137 A1* | 11/2008 | Budinger | 228/119 |
| 2008/0292903 A1* | 11/2008 | Milleville et al. | 428/680 |
| 2009/0007724 A1* | 1/2009 | Liu | 75/230 |
| 2009/0014821 A1* | 1/2009 | Mattila et al. | 257/428 |
| 2009/0191422 A1* | 7/2009 | Tryon et al. | 428/623 |
| 2009/0233120 A1* | 9/2009 | Maruyama et al. | 428/612 |
| 2009/0238693 A1* | 9/2009 | Jabado et al. | 416/241 R |
| 2010/0000976 A1* | 1/2010 | Ott et al. | 219/121.17 |
| 2010/0047614 A1* | 2/2010 | Brinley | 428/615 |
| 2010/0126014 A1* | 5/2010 | Gupta et al. | 29/889.1 |
| 2010/0297345 A1* | 11/2010 | Jensen et al. | 427/142 |

OTHER PUBLICATIONS

Material Certification for Product AMDRY 718CL.B from Sulzer Metco Inc., Jul. 12, 2007 (1 page).

Website Printout entitled "Integran—Our Nanotechnology Platform," from http://www.integran.com (4 pages).

* cited by examiner

METHOD FOR DIFFUSION BONDING METALLIC COMPONENTS WITH NANOPARTICLE FOIL

CROSS-REFERENCE TO RELATED APPLICATION(S)

This application claims priority to Singapore Patent Application No. 200801932-5, filed on Mar. 10, 2008, and entitled "Method For Diffusion Bonding Metallic Components With Nanoparticle Foil", the disclosure of which is incorporated by reference in its entirety.

BACKGROUND

The present invention relates to the manufacture and restoration of metal components, such as components of gas turbine engines. In particular, the present invention relates to diffusion bonding techniques for manufacturing and repairing metal components.

Superalloys of nickel and cobalt are typically employed in gas turbine engine components due to the high mechanical strengths and creep resistances obtained with such materials. Because gas turbine engine components are exposed to extreme temperatures and pressures, high mechanical strengths and creep resistances are required to preserve the integrity of the engine over the course of operation. However, over time, exposed portions of the components are subject to wear and other degradations, which can lead to reductions in operational efficiencies.

Due to economic factors, it is common practice in the aerospace industry to restore turbine engine components rather than replace them. Such restorations desirably restore damaged regions of the engine components to their original dimensions. One area of practice that has been a major interest to the aerospace industry for restoring turbine engine components involves the joining of the superalloy parts. Current joining techniques such as laser welding processes and tungsten inert gas welding processes are suitable for joining superalloy components. However, these techniques may induce crack formations in the metal components, which can also reduce operational efficiencies.

Other joining methods, such as brazing techniques, can be time consuming due to post-bond heat treatments. For example, brazing operations typically subject the superalloys of the engine components to high temperatures for extended durations. Exposure to the high temperatures for the extended durations may reduce the low-temperature creep resistances of the superalloys, particularly with single crystal alloys. Additionally, the brazed engine components typically have polycrystalline microstructures, which have lower mechanical strengths and creep resistances compared to the microstructures of single crystal alloys. Accordingly, there is a need for improvements to the existing joining techniques to meet the more demanding requirements when joining high performance materials.

SUMMARY

The present invention relates to a method for joining a first metal part and a second metal part of a gas turbine engine component. The method includes positioning a thin-film, nanoparticle foil between faying surfaces of the first and second metal parts, and diffusion bonding the first and second metal parts with the nanoparticle foil.

DETAILED DESCRIPTION

Figure 1:
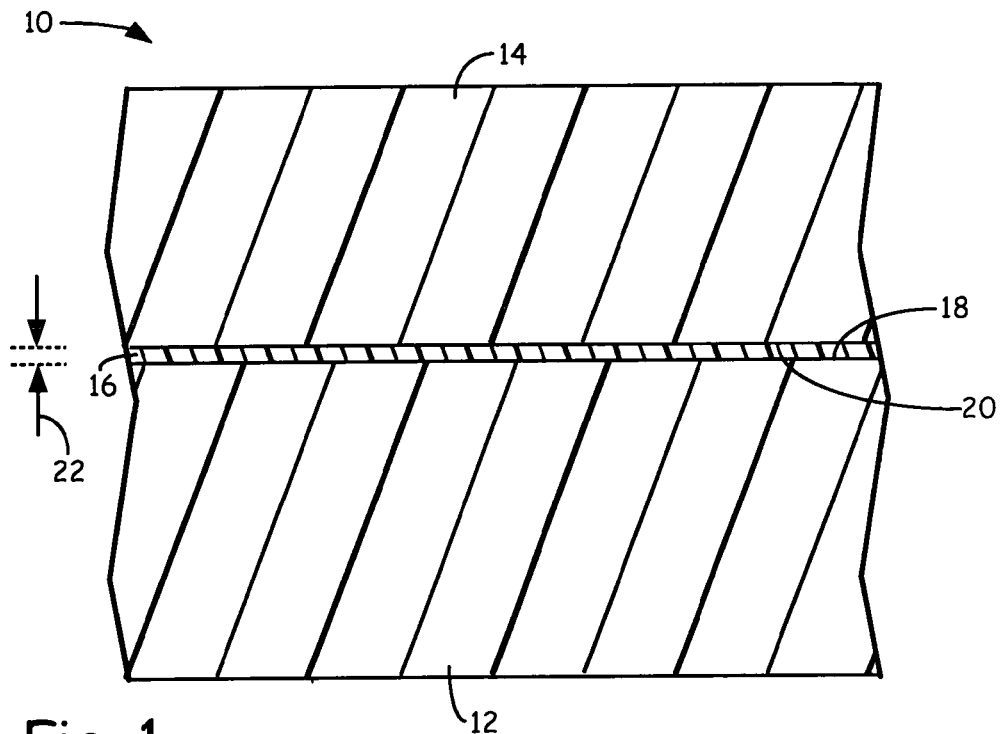
FIG. 1 is a sectional view of a turbine engine component having a pair of metal parts being joined together with a nanoparticle foil.

FIG. 1 is a sectional view of turbine engine component 10, which includes base part 12, top part 14, and foil 16, and illustrates a suitable technique for joining top part 14 to base part 12 with a diffusion bonding process. Turbine engine component 10 is a component of gas turbine engine, such as a turbine stage blade or vane. Base part 12 and top part 14 are first and second metal parts of turbine engine component 10, which are to be joined with the use of foil 16. For example, in a restoration operation to dimensionally restore turbine engine component 10, base part 12 may be a damaged base portion of turbine engine component 10 that requires repair. In this example, top part 14 may be a replacement part for the damaged region of base part 12, thereby allowing turbine engine component 10 to be dimensionally restored to its original dimensions. In an alternative example, base part 12 and top part 14 may be original equipment manufacturer (OEM) parts for initially manufacturing turbine engine component 10 with the diffusion bonding process.

As shown, base part 12 and top part 14 respectively include faying surfaces 18 and 20, which are the surfaces at which base part 12 and top part 14 are to be joined. Faying surfaces 18 and 20 are desirably smooth surfaces to increase the atomic contact of the materials of base part 12, top part 14, and foil 16. Suitable materials for base part 12 and top part 14 may depend on the function of turbine engine component 10. For example, for components that are subjected to high temperatures and pressures of a high-pressure turbine stage (e.g., turbine blades and vanes), suitable materials for base part 12 and top part 14 include superalloys having directionally-solidified or single-crystal microstructures. Examples of suitable materials for each of base part 12 and top part 14 include nickel-based superalloys, cobalt-based superalloys and combinations thereof; and may also include one or more additional materials such as titanium, chromium, niobium, hafnium, tantalum, molybdenum, tungsten, aluminum, carbon, and iron. As used herein, the term "metal part" refers to a part that is derived primarily from one or more metals, but may also include low concentrations (e.g., less than about 10 percent by weight) of non-metal additives. As discussed below, the diffusion bonding process allows base part 12 and top part 14 to be fabricated from materials that are substantially the same, thereby preserving the physical and mechanical properties of turbine engine component 10. As used herein, the term "substantially the same", when used to describe material compositions, refers to compositions that are within standard manufacturing tolerances for the given materials.

Foil 16 is a nanoparticle alloy foil disposed between faying surfaces 18 and 20, which assists the diffusion bonding process to join base part 12 and top part 14. Foil 16 is derived from an alloy that is desirably substantially the same as the compositions of base part 12 and top part 14. Accordingly, suitable materials for foil 16 include the suitable materials discussed above for base part 12 and top part 14. However, in contrast to the materials of base part 12 and top part 14, the alloy of foil 16 has a nanometer-scale average particle size. This increases the interdiffusion between the materials of base part 12 and top part 14, and allows the resulting bond between base part 12 and top part 14 to exhibit the same microstructure as the material microstructures of base part 12 and top part 14 (e.g., directionally-solidified or single-crystal microstructures). This preserves the physical and mechanical properties of turbine engine component 10 and the bond location. Furthermore, the increased interdiffusion obtained with the nanoparticle alloy of foil 16 allows base part 12 and top part 14 to be joined with substantially no bond line at the interface of faying surfaces 18 and 20.

Examples of suitable average particle sizes for the nanoparticle alloy of foil 16 include sizes of about 500 nanometers or less, with particularly suitable average particle sizes including sizes of about 100 nanometers or less, with even more particularly suitable average particle sizes including sizes of about 50 nanometers or less, and with even more particularly suitable average particle sizes including sizes of about 20 nanometers or less. In one embodiment, the nanoparticle alloy of foil 16 is substantially free of large particles. In this embodiment, examples of suitable maximum particle sizes for foil 16 include particles sizes of about 500 nanometers, with particularly suitable maximum particles sizes for foil 16 including particles sizes of about 100 nanometers, and with even more particularly suitable maximum particles sizes for foil 16 including particles sizes of about 50 nanometers.

Foil 16 is also desirably a thin-film foil, which reduces the formation of a bond line at the interface of faying surfaces 18 and 20. Examples of suitable thicknesses for foil 16 (referred to as film thickness 22) include thicknesses of about 100 micrometers or less, with particularly suitable film thicknesses ranging from about 2 micrometers to about 50 micrometers, and with even more particularly suitable film thicknesses ranging from about 10 micrometers to about 25 micrometers. Examples of commercially available thin-film, nanoparticle alloy foils that are suitable for use in the diffusion bonding process include nanomaterial foils available from Integran Technologies, Inc., Pittsburgh, Pa. In one embodiment, foil 16 may be treated to exhibit surface roughness on one or both major surfaces of foil 16 (i.e., the surfaces facing faying surfaces 18 and 20). This assists in instigating a resistance effect during the diffusion bonding process.

Prior to performing the diffusion bonding process, foil 16 is positioned between faying surfaces 18 and 20, such that foil 16 extends at least partially across the entire surface area between faying surfaces 18 and 20. In one embodiment, foil 16 extends across the entire surface area between faying surfaces 18 and 20. Alternatively, multiple foils 16 may be used to cover one or more portions of the surface area between faying surfaces 18 and 20. When foil 16 is positioned between faying surfaces 18 and 20, base part 12 and top part 14 are compressed together to secure foil 16 between faying surfaces 18 and 20. The diffusion bonding process is then performed to join base part 12 and top part 14 with the use of foil 16. The diffusion bonding process is desirably performed under reduced pressure or vacuum conditions. Examples of suitable pressures for performing the diffusion bonding process include about 13 millipascals (about $10^{-4}$ Torr) or less, with more particularly suitable pressures including about 1.3 millipascals (about $10^{-5}$ Torr) or less. In alternative embodiments, the diffusion bonding process may be performed in an insert gas atmosphere (e.g., argon).

The diffusion bonding process involves exposing base part 12 and top part 14 to an elevated temperature and applying a pressure upon base part 12 and/or top part 14, thereby forcing faying surfaces 18 and 20 together against foil 16. The pressure may be applied to base part 12, top part 14, or both, in a uniaxial or isostatic manner. Suitable pressures for the diffusion bonding process include pressures that are within the range of interatomic forces of the materials of base part 12, top part 14; and foil 16. This allows the materials of base part 12 and top part 14 to interdiffuse with each other and with the nanoparticle alloy of foil 16. The applied pressure is also desirably less than pressures that cause macrodeformations of the materials of base part 12 and top part 14, thereby preserving the structural integrities of base part 12 and top part 14. The pressure required to reach the range of the material interatomic forces is also dependent on the elevated temperature used in the diffusion bonding process. Examples of suitable elevated temperatures for use in the diffusion bonding process include temperatures that are less than the melting point temperatures of the materials of base part 12, top part 14, and foil 16, with particularly suitable elevated temperatures ranging from about 1000° C. to about 1300° C., and with even more particularly suitable elevated temperatures ranging from about 1100° C. to about 1200° C.

The diffusion bonding process is performed for a duration that is suitable to form a diffusion bond between base part 12 and top part 14. Examples of suitable durations for the diffusion bonding process range from about 10 minutes to about 10 hours, with particularly suitable durations ranging from about one hour to about five hours. In one embodiment, the diffusion bonding process is performed in multiple phases having decreasing temperatures and increasing durations. For example, a suitable diffusion brazing process includes an initial diffusion bonding phase in which base part 12 and top part 14 are placed under pressure at a first temperature (e.g., about 1230° C.) for a first duration (e.g., about 15 minutes). This is then followed by a second diffusion bonding phase, where the temperature is reduced (e.g., to about 1175° C.) and is maintained for a longer duration (e.g., about 4 hours).

The diffusion bonding process causes the materials of base part 12, top part 14, and foil 16 to interdiffuse in a solid-state manner, thereby forming a solid-state bond between base part 12 and top part 14 at the interface of faying surfaces 18 and 20. The nanoparticle alloy of foil 16 accordingly increases the interdiffusion between base part 12 and top part 14, thereby allowing base part 12 and top part 14 to retain their respective microstructures. For example, when base part 12 and top part 14 are each fabricated from substantially the same single-crystal superalloys, and where foil 16 is derived from a nanoparticle alloy having substantially the same composition as the single-crystal superalloys, the resulting turbine engine component 10 substantially retains the single-crystal microstructure of base part 12 and top part 14 at the interface of faying surfaces 18 and 20. This preserves the physical and mechanical properties of turbine engine-component 10.

Figure 2:
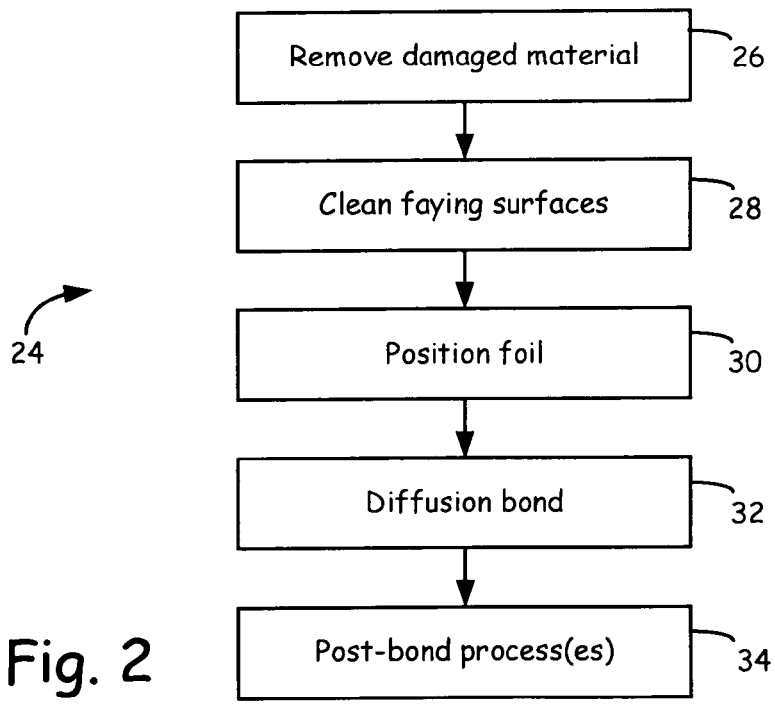
FIG. 2 is a flow diagram of a method for dimensionally restoring a gas turbine engine component.

FIG. 2 is a flow diagram of method 24 for dimensionally restoring a gas turbine engine component with the use of the above-discussed diffusion bonding process. The following discussion of method 24 is made with reference to turbine engine component 10 (shown in FIG. 1) with the understanding that method 24 is suitable for use in joining a variety of different metal parts with the use of a nanoparticle foil. As shown, method 24 includes steps 26-34, and initially involves removing damaged material from one or more regions of base part 12 (step 26). During the course of operation in a gas turbine engine, base part 12 may be subjected to wear and oxidation conditions, which results in damaged material on base part 12. As such, removal of the damaged material is required to dimensionally restore turbine engine component 10 with top part 14. Accordingly, top part 14 is a replacement part that desirably has dimensions that match the dimensions of the removed damaged material.

The removal of the damaged material provides faying surface 18, which, as discussed above, is the surface of base part 12 that will be joined to faying surface 20 of top part 14. Prior to the diffusion bonding process, faying surfaces 18 and 20 are desirably cleaned to remove any impurities that may adversely affect the interdiffusion of the materials of base part 12 and top part 14 (step 28). Faying surfaces 18 and 20 may be cleaned in a variety of manners, such as with a hydrogen fluoride cleaning process.

After cleaning, foil 16 is then positioned between faying surfaces 18 and 20 (step 30), where foil 16 desirably has substantially the same composition as the materials of base part 12 and top part 14. Foil 16 may be positioned between faying surfaces 18 and 20 in a variety of manners. For example, foil 16 may be placed on faying surface 18 of base part 12, and top part 12 may then be placed on foil 16 such that foil 16 is disposed between faying surfaces 18 and 20. Alternatively, top part 14 may be positioned above base part 12 such that faying surfaces 18 and 20 face each other. Foil 16 may then be inserted between faying surfaces 18 and 20, and base part 12 and top part 14 may be closed together, thereby positioning foil 16 between faying surfaces 18 and 20.

A diffusion bonding process is then performed on base part 12, top part 14, and foil 16 (step 32), which is performed in same manner as discussed above. This interdiffuses at least a portion of the materials of base part 12, top part 14, and foil 16 in a solid-state manner. As discussed above, the interdiffusion forms a solid-state bond between base part 12 and top part 14 at the interface of faying surfaces 18 and 20, which allows base part 12 and top part 14 to retain their respective microstructures (e.g., directionally-solidified or single-crystal microstructures). As such, the physical and mechanical properties of turbine engine component 10 are preserved for subsequent use in a gas turbine engine. After the diffusion bonding process is complete, the resulting turbine engine component 10 may be cooled, and undergo one or more post-bonding processes (step 34). For example, turbine engine component 10 may undergo a post-bond machining and cleaning process to remove any excess material that resulted from the diffusion bonding process. Turbine engine component 10 may also be coated with one or more layers to provide oxidization, abrasion, and/or thermal resistance.

While method 24 is discussed above with reference to a dimensional restoration process, method 24 is also suitable for use in manufacturing turbine engine components, where the removal of the damaged material in step 26 may be replaced with a step of casting the metal parts (e.g., base part 12 and top part 14). Thus, method 24 may be used to join a variety of different metal parts using a diffusion bonding process with a nanoparticle foil.

Although the present invention has been described with reference to preferred embodiments, workers skilled in the art will recognize that changes may be made in form and detail without departing from the spirit and scope of the invention.

The invention claimed is:

1. A method for joining a first metal part and a second metal part of a gas turbine engine component, the method comprising:
    positioning a nanoparticle foil between a faying surface of the first metal part and a faying surface of the second metal part, the nanoparticle foil having a film thickness of about 100 micrometers or less, and comprising an alloy having an average particle size of about 500 nanometers or less, wherein the first metal part and the second metal part are derived from alloys that are substantially the same, and wherein the alloy of the nanoparticle foil is substantially the same as the alloys of the first metal part and the second metal part; and
    diffusion bonding the first metal part and the second metal part with the nanoparticle foil.

2. The method of claim 1, wherein the average particle size of the alloy of the nanoparticle foil is about 100 nanometers or less.

3. The method of claim 2, wherein the average particle size of the alloy of the nanoparticle foil is about 50 nanometers or less.

4. The method of claim 1, wherein the film thickness of the nanoparticle foil ranges from about 2 micrometers to about to about 50 micrometers.

5. The method of claim 1, wherein the positioned nanoparticle foil extends across an entire surface area of the faying surfaces of the first metal part and the second metal part.

6. A method for joining a first metal part and a second metal part of a gas turbine engine component, the method comprising:
    positioning a nanoparticle foil between a faying surface of the first metal part and a faying surface of the second metal part, the nanoparticle foil having a film thickness of about 100 micrometers or less, and comprising an alloy having an average particle size of about 500 nanometers or less, wherein the alloys of the first metal part, the second metal part, and the nanoparticle film each comprise a material selected from the group consisting of nickel-based superalloys, cobalt-based superalloys, and combinations thereof; and
    diffusion bonding the first metal part and the second metal part with the nanoparticle foil.

7. A method for joining a first metal part derived from a first alloy and a second metal part derived from a second alloy, the method comprising:
    positioning at least one nanoparticle foil between a faying surface of the first metal part and a faying surface of the second metal part, the at least one nanoparticle foil having a film thickness of about 100 micrometers or less, and comprising a third alloy having an average particle size of about 500 nanometers or less, wherein the first metal part and the second metal part are derived from alloys that are substantially the same, and wherein the alloy of the nanoparticle foil is substantially the same as the alloys of the first metal part and the second metal part;
    heating the first metal part, the second metal part, and the at least one nanoparticle foil to an elevated temperature; and
    inducing a pressure to the first metal part and the second metal part that is greater than interatomic forces of the first alloy, the second alloy, and the third alloy at the elevated temperature, thereby allowing the first alloy, the second alloy, and the third alloy to at least partially interdiffuse.

8. The method of claim 7, wherein the average particle size of the third alloy is about 100 nanometers or less.

9. The method of claim 8, wherein the average particle size of the third alloy is about 50 nanometers or less.

10. The method of claim 7, wherein the elevated temperature is less than melting temperatures of the first alloy, the second alloy, and the third alloy.

11. The method of claim 10, wherein the elevated temperature ranges from about 1000° C. to about 1300° C.

12. A method for restoring a turbine engine component, the method comprising:

removing damaged material from a base metal part of the turbine engine component to provide a faying surface of the base metal part, wherein the base metal part comprises a first alloy;

cleaning the faying surface of the base metal part;

cleaning a faying surface of a replacement metal part of the turbine engine component, the replacement metal part comprising a second alloy;

positioning a nanoparticle foil between the faying surface of the base metal part and the faying surface of the replacement metal part, the nanoparticle foil having a film thickness of about 100 micrometers or less, and comprising a third alloy having an average particle size of about 500 nanometers or less; and interdiffusing at least a portion of the first alloy, the second alloy, and the third alloy in a solid-state manner.

13. The method of claim 12, wherein the average particle size of the third alloy is about 100 nanometers or less.

14. The method of claim 13, wherein the average particle size of the third alloy is about 50 nanometers or less.

15. The method of claim 14, further comprising heating the base metal part, the replacement metal part, and the nanoparticle foil to an elevated temperature, wherein the interdiffusing is performed at the elevated temperature.

16. The method of claim 12, wherein the first alloy, the second alloy, and the third alloy are substantially the same.

* * * * *

UNITED STATES PATENT AND TRADEMARK OFFICE
CERTIFICATE OF CORRECTION

PATENT NO. : 7,874,472 B2
APPLICATION NO. : 12/082328
DATED : January 25, 2011
INVENTOR(S) : Glenn Hong Guan Lee and Wee Kwong Na It is certified that error appears in the above-identified patent and that said Letters Patent is hereby corrected as shown below:

On the title page item (73),
Assignee: Delete "United Technologies Corporation, Hartford, CT (US)"
Insert -- TURBINE OVERHAUL SERVICES PTE LTD, JURONG TOWN, SINGAPORE --

Signed and Sealed this
Nineteenth Day of July, 2011

David J. Kappos
*Director of the United States Patent and Trademark Office*